(12) United States Patent  (10) Patent No.: US 8,497,902 B2
Osman  (45) Date of Patent: Jul. 30, 2013

(54) SYSTEM FOR LOCATING A DISPLAY DEVICE USING A CAMERA ON A PORTABLE DEVICE AND A SENSOR ON A GAMING CONSOLE AND METHOD THEREOF

(75) Inventor: Steven Osman, San Francisco, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 194 days.

(21) Appl. No.: 12/642,663

(22) Filed: Dec. 18, 2009

(65) Prior Publication Data

US 2011/0151970 A1 Jun. 23, 2011

(51) Int. Cl.
*H04N 7/18* (2006.01)
(52) U.S. Cl.
USPC .................. 348/142; 345/156; 463/31
(58) Field of Classification Search
USPC ............. 345/156, 158; 382/103, 154; 463/33, 463/31; 348/142, 169
See application file for complete search history.

(56) References Cited

U.S. PATENT DOCUMENTS

| | | | |
|---|---|---|---|
| 4,787,051 A | 11/1988 | Olson | |
| 4,843,568 A | 6/1989 | Krueger | |
| 5,128,671 A | 7/1992 | Thomas, Jr. | |
| 5,528,265 A | 6/1996 | Harrison | |
| 6,157,368 A | 12/2000 | Faeger | |
| 6,375,572 B1 | 4/2002 | Masuyama | |
| 6,489,945 B1* | 12/2002 | Gordon | 345/158 |
| 6,577,249 B1 | 6/2003 | Akatsuka et al. | |
| 6,677,935 B2* | 1/2004 | Kobayashi et al. | 345/181 |
| 7,308,112 B2* | 12/2007 | Fujimura et al. | 382/103 |
| 7,657,079 B2* | 2/2010 | Lake et al. | 382/154 |
| 7,844,106 B2* | 11/2010 | Pfister et al. | 382/154 |
| 2002/0085097 A1 | 7/2002 | Colmenarez et al. | |
| 2004/0212589 A1 | 10/2004 | Hall et al. | |
| 2004/0246272 A1* | 12/2004 | Ramian | 345/660 |

(Continued)

FOREIGN PATENT DOCUMENTS

WO 2009/059716 A1 5/2009

OTHER PUBLICATIONS

International Search Report and Written Opinion in International Application No. PCT/US2010/055182, mailed Jan. 13, 2011.

(Continued)

*Primary Examiner* — Dmitry Suhol
*Assistant Examiner* — Jason Yen
(74) *Attorney, Agent, or Firm* — Nixon Peabody LLP; Khaled Shami

(57) ABSTRACT

Embodiments of the present disclosure relate to a method, system, and computer-readable medium for locating a sensor of a gaming console relative to a position of a display device in a gaming system includes displaying an image on the display device, estimating the first position and first orientation of the display device relative to the portable device, once the sensor on the portable device has found the image on the display device, instructing the user to move the portable device to a new position, estimating the second position and second orientation of the display device relative to the portable device, once the sensor on the portable device has found the image on the display device, determining the size of the display device using information gathered during the estimating of the first position and orientation and the estimating of the second position and orientation, and determining the orientation of the display device relative to a sensor of a gaming console using the two findings sent to the gaming console.

45 Claims, 5 Drawing Sheets

U.S. PATENT DOCUMENTS

| | | | |
|---|---|---|---|
| 2005/0272506 A1* | 12/2005 | Sumi | 463/51 |
| 2006/0209013 A1* | 9/2006 | Fengels | 345/156 |
| 2006/0233422 A1* | 10/2006 | Toyama | 382/103 |
| 2007/0066393 A1* | 3/2007 | Paul et al. | 463/36 |
| 2007/0225072 A1* | 9/2007 | Xing | 463/30 |
| 2007/0285386 A1* | 12/2007 | Lim et al. | 345/156 |
| 2008/0239081 A1* | 10/2008 | Helbing | 348/169 |
| 2008/0240550 A1* | 10/2008 | Morita et al. | 382/154 |
| 2008/0318683 A1* | 12/2008 | Rofougaran et al. | 463/39 |
| 2009/0209343 A1* | 8/2009 | Foxlin et al. | 463/36 |
| 2009/0231425 A1* | 9/2009 | Zalewski | 348/142 |
| 2011/0110559 A1* | 5/2011 | Chen et al. | 382/103 |
| 2011/0124410 A1* | 5/2011 | Mao et al. | 463/31 |

OTHER PUBLICATIONS

Bolt, R.A., "Put-that-there: Voice and Gesture at the Graphics Interface", Computer Graphics, vol. 14, No. 3, ACM SIGGRAPH Conference Proceedings, Jul. 1980, pp. 262-270.

DeWitt, T. et al., and Edelstein, "Pantomation: A System for Position Tracking," Proceedings of the Second Symposium on Small Computers in the Arts, IEEE Computer Society Catalog No. 455, 1982, pp. 61-69.

* cited by examiner

SYSTEM FOR LOCATING A DISPLAY DEVICE USING A CAMERA ON A PORTABLE DEVICE AND A SENSOR ON A GAMING CONSOLE AND METHOD THEREOF

TECHNICAL FIELD

The present disclosure relates generally to locating a camera of a gaming console relative to a display device.

BACKGROUND

Video game systems have been a popular form of entertainment for decades. The basic pieces of most modern video game systems have a similar list of core components, which include a user control interface, a central processing unit (CPU), a random-access memory (RAM), a software kernel, storage medium for video games, video output, audio output, and a power supply.

The user control interface allows the user to interact with the video game, and most gaming systems are accompanied by at least one sophisticated remote controller which has a variety of buttons and special features. Video game systems rely on RAM to provide temporary storage of games as they are being played. Without RAM, even the fastest CPU would not provide the necessary speed for an interactive gaming experience.

At its core, a video game system has a console that is a highly specialized computer. The software kernel component is the gaming console's operating system, and provides the interface between the various pieces of hardware. Two of the most common storage technologies used for modern video games systems are CD and ROM-based cartridges. Some current systems also offer a solid-state memory card for storing saved games and personal features.

Gaming consoles provide a video signal that is compatible with a display device, such as a television or monitor. Moreover, most gaming consoles have a dedicated graphics processor that provides specialized mapping, texturing, and geometric functions in addition to controlling video output. Another dedicated chip typically handles the audio processing and outputs to stereo sound or digital surround sound.

The most recent generation of gaming systems also include a sensor device that is connected to the gaming console, such as the Eye Toy™ for Sony's PlayStation®3 and the Wii™ Sensor Bar for Nintendo's Wii™, which improves functionality of the remote controller.

OVERVIEW

As described herein, a method for locating a portable device relative to a position of a display device in a gaming system, includes displaying an image on the display device, estimating the first position and first orientation of the display device relative to the portable device, once the portable device has found the image on the display device, instructing the user to move the portable device to a new position, estimating the second position and second orientation of the display device relative to the portable device, once the portable device has found the image on the display device, determining the size of the display device using information gathered during the estimating of the first position and orientation and the estimating of the second position and orientation, and determining the orientation of the display device relative to a sensor of a gaming console using information gathered during the estimating of the first position and orientation and the estimating of the second position and orientation.

Also as described herein, a method for locating a sensor of a gaming console relative to a position of a display device in a gaming system, includes instructing the portable device to search for the image, wherein the gaming console instructs the portable device to search for the image, searching for the image on the display device using a camera on the portable device, searching the image on the camera of the portable device for the pattern on the display device, sending findings of the portable device to the gaming console, wherein the portable device wirelessly sends the findings to the gaming console, determining a first position of a gaming console relative to the portable device using a sensor on the gaming console, determining a first orientation of the gaming console relative to the portable device using the sensor on the gaming console, determining a second position of the gaming console relative to the portable device using the sensor on the gaming console, determining a second orientation of the gaming console relative to the portable device using the sensor on the gaming console, instructing the portable device to search for the image on the display device from the second position, wherein the gaming console instructs the portable device to search for the image, searching for the image on the display device from the second position of the portable device using the sensor on the portable device, searching the image of the sensor on the portable device for the pattern on the display device, sending new findings of the portable device to the gaming console, wherein the portable device wirelessly sends the findings to the gaming console, prompting a user to position the portable device such that a sensor on the portable device can detect an image on the display device, instructing the display device to display an image, wherein the gaming console instructs the display device to display the image, detecting the movement of the portable device using the gaming console, wherein the step of estimating the first position and the first orientation of the portable device is accomplished using a pose estimation algorithm, wherein the step of estimating the second position and the second orientation of the portable device is accomplished using a pose estimation algorithm, wherein the portable device includes a gamepad, a joystick, a universal remote, a remote controller, a cellular phone equipped with a camera, a Sony PlayStation® Remote, and a Sony PlayStation® Portable (PSP™), wherein the gaming console comprises a video gaming console, wherein the display device comprises at least one of a cathode ray tube, a flat panel display, a liquid crystal display (LCD), a plasma display panel (PDP), an organic light-emitting diode display (OLED), a field emission display (FED), a nanocrystal display, a laser TV, and an electroluminescent display (ELD), wherein the sensor of the gaming console comprises at least one of a camera, an ultrasonic emitter, an ultrasonic detector, a magnetic emitter, a magnetic coil, a light-emitting diode, or any combination thereof, wherein the sensor of the portable device comprises at least one of a camera, an ultrasonic emitter, an ultrasonic detector, a magnetic emitter, a magnetic coil, a light-emitting diode, motion sensor, or any combination thereof, instructing the user to move the portable device to a different new position, if it is determined that the new position is along the axis that passes through candidate display devices, determining a second position of the gaming console relative to the portable device using the sensor on the portable device, and determining a second orientation of the gaming console relative to the portable device using the sensor on the portable device.

As described herein, a system for locating a portable device relative to a position of a display device in a gaming system, includes means for displaying an image on the display device, means for estimating the first position and first orientation of the display device relative to the portable device, once the portable device has found the image on the display device, means for instructing the user to move the portable device to a new position, means for estimating the second position and second orientation of the display device relative to the portable device, once the portable device has found the image on the display device, means for determining the size of the display device using information gathered during the estimating of the first position and orientation and the estimating of the second position and orientation, and means for determining the orientation of the display device relative to the sensor of the gaming console using information gathered during the estimating of the first position and orientation and the estimating of the second position and orientation.

As described herein, a system for locating a portable device relative to a position of a display device in a gaming system, includes means for instructing the portable device to search for the image, wherein the gaming console instructs the portable device to search for the image, means for searching for the image on the display device using the sensor on the portable device, means for searching the image on the sensor of the portable device for the pattern on the display device, means for sending findings of the portable device to the gaming console, wherein the portable device wirelessly sends the findings to the gaming console, means for determining a first position of a gaming console relative to the portable device using a sensor on the gaming console, means for determining a first orientation of the gaming console relative to the portable device using the sensor on the gaming console, means for determining a second position of the gaming console relative to the portable device using the sensor on the gaming console, means for determining a second orientation of the gaming console relative to the portable device using the sensor on the gaming console, means for instructing the portable device to search for the image on the display device from the second position, wherein the gaming console instructs the portable device to search for the image, means for searching for the image on the display device from the second position of the portable device using the sensor on the portable device, means for searching the image of the sensor on the portable device for the pattern on the display device, means for sending new findings of the portable device to the gaming console, wherein the portable device wirelessly sends the findings to the gaming console, means for prompting a user to position the portable device such that a sensor on the portable device can detect an image on the display device, means for instructing the display device to display an image, wherein the gaming console instructs the display device to display the image, means for detecting the movement of the portable device using the gaming console, wherein the means for estimating the first position and the first orientation of the portable device uses a pose estimation algorithm, wherein the means for estimating the second position and the second orientation of the portable device uses a pose estimation algorithm, wherein the portable device includes a gamepad, a joystick, a universal remote, a remote controller, a cellular phone equipped with a camera, a Sony PlayStation® Remote, and a Sony PlayStation® Portable (PSP™), wherein the gaming console is a video gaming console, wherein the display device comprises at least one of a cathode ray tube, a flat panel display, a liquid crystal display (LCD), a plasma display panel (PDP), an organic light-emitting diode display (OLED), a field emission display (FED), a nanocrystal display, a laser TV, and an electroluminescent display (ELD), wherein the sensor of the gaming console comprises at least one of a camera, an ultrasonic emitter, an ultrasonic detector, a magnetic emitter, a magnetic coil, a light-emitting diode, motion sensor, or any combination thereof, wherein the sensor of the portable device comprises at least one of a camera, an ultrasonic emitter, an ultrasonic detector, a magnetic emitter, a magnetic coil, a light-emitting diode, or any combination thereof, and means for instructing the user to move the portable device to a different new position, if it is determined that the new position is along the axis that passes through candidate display devices, means for determining a second position of the gaming console relative to the portable device using the sensor on the portable device, and means for determining a second orientation of the gaming console relative to the portable device using the sensor on the portable device.

As described herein, a computer-readable medium for use in a gaming system for locating a portable device relative to a position of a display device within the gaming system, includes means for displaying an image on the display device, means for estimating the first position and first orientation of the display device relative to the portable device, once the portable device has found the image on the display device, means for instructing the user to move the portable device to a new position, means for estimating the second position and second orientation of the display device relative to the portable device, once the portable device has found the image on the display device, means for determining the size of the display device using information gathered during the estimating of the first position and orientation and the estimating of the second position and orientation, and means for determining the orientation of the display device relative to the sensor of the gaming console using information gathered during the estimating of the first position and orientation and the estimating of the second position and orientation.

As described herein, a computer-readable medium for use in a gaming system for locating a portable device relative to a position of a display device within the gaming system, includes means for instructing the portable device to search for the image, wherein the gaming console instructs the portable device to search for the image, means for determining a first position of a gaming console relative to the portable device using a camera on the gaming console, means for determining a first orientation of the gaming console relative to the portable device using the camera on the gaming console, means for determining a first position of a gaming console relative to the portable device using a sensor on the gaming console, means for determining a first orientation of the gaming console relative to the portable device using the sensor on the gaming console, means for displaying an image on the display device, means for instructing the portable device to search for the image, wherein the gaming console instructs the portable device to search for the image, means for estimating the first position and first orientation of the display device relative to the portable device, once the sensor on the portable device has found the image on the display device, means for instructing the user to move the portable device to a new position, means for estimating the second position and second orientation of the display device relative to the portable device, once the sensor on the portable device has found the image on the display device, means for determining the size of the display device using information gathered during the estimating of the first position and orientation and the estimating of the second position and orientation, means for determining the orientation of the display device relative to the portable device using the two findings sent to the gaming console, means for searching for the image on the display device using the sensor on the portable device, means for searching the image on the sensor of the portable device for the pattern on the display device, means for sending findings of the portable device to the gaming console, wherein the portable device wirelessly sends the findings to the gaming console, means for determining a second position of the gaming console relative to the portable device using the sensor on the gaming console, means for determining a second orientation of the gaming console relative to the portable device using the sensor on the gaming console, means for instructing the portable device to search for the image on the display device from the second position, wherein the gaming console instructs the portable device to search for the image, means for searching for the image on the display device from the second position of the portable device using the sensor on the portable device, means for searching the image of the sensor on the portable device for the pattern on the display device, means for sending new findings of the portable device to the gaming console, wherein the portable device wirelessly sends the findings to the gaming console, means for prompting a user to position the portable device such that a sensor on the portable device can detect an image on the display device, means for instructing the display device to display an image, wherein the gaming console instructs the display device to display the image, means for detecting the movement of the portable device using the gaming console, wherein the means for estimating the first position and the first orientation of the portable device uses a pose estimation algorithm, wherein the means for estimating the second position and the second orientation of the portable device uses a pose estimation algorithm, wherein the portable device includes a gamepad, a joystick, a universal remote, a remote controller, a cellular phone equipped with a camera, a Sony PlayStation® Remote, and a Sony PlayStation® Portable (PSP™), wherein the gaming console is a video gaming console, wherein the display device comprises at least one of a cathode ray tube, a flat panel display, a liquid crystal display (LCD), a plasma display panel (PDP), an organic light-emitting diode display (OLED), a field emission display (FED), a nanocrystal display, a laser TV, and an electroluminescent display (ELD), wherein the sensor of the gaming console comprises at least one of a camera, an ultrasonic emitter, an ultrasonic detector, a magnetic emitter, a magnetic coil, a light-emitting diode, or any combination thereof, wherein the sensor of the portable device comprises at least one of a camera, an ultrasonic emitter, an ultrasonic detector, a magnetic emitter, a magnetic coil, a light-emitting diode, motion sensor, or any combination thereof and means for instructing the user to move the portable device to a different new position, if it is determined that the new position is along the axis that passes through candidate display devices, means for determining a second position of the gaming console relative to the portable device using the sensor on the portable device, and means for determining a second orientation of the gaming console relative to the portable device using the sensor on the portable device.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

In the drawings.

DESCRIPTION OF EXAMPLE EMBODIMENTS

Example embodiments are described herein in the context of a system of computers, servers, and software. Those of ordinary skill in the art will realize that the following description is illustrative only and is not intended to be in any way limiting. Other embodiments will readily suggest themselves to such skilled persons having the benefit of this disclosure. Reference will now be made in detail to implementations of the example embodiments as illustrated in the accompanying drawings. The same reference indicators will be used to the extent possible throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Video games and video gaming consoles often require a configuration step to determining the position of a camera, such as in Sony PlayStation®3, or another sensor device (e.g., Wii™ Sensor Bar) relative to the position of the display device. Because this is accomplished by asking the player, the calibration is often limited to the gaming console inquiring "is the sensor above or below your TV?" Alternately, for environments that include a physical pointer, for example a GunCon or Wii™ Remote, the calibration phase may include instructing the gamer to point at key locations on the screen, and the remainder of the gaming experience will be based entirely on the accuracy of this calibration. However, a limited determination of the sensor being positioned merely above or below the display device, or the inaccuracy of a user's aim can cause poor calibration of the gaming system.

The present gaming system allows for more accuracy while playing a video game by removing simplistic "above or below" calibration choices, and by not requiring a precise aim for accurate calibration of the system. The present gaming system achieves this by a precise determination of the sensor's position and orientation relative to the display device as well as determining the size of the display device.

The present gaming system takes advantage of computer vision techniques that can determine the position of an object by a set of visible features and/or markers on the object. It also takes advantage of new portable devices that have cameras as well as reasonably powerful computing ability.

Figure 1:
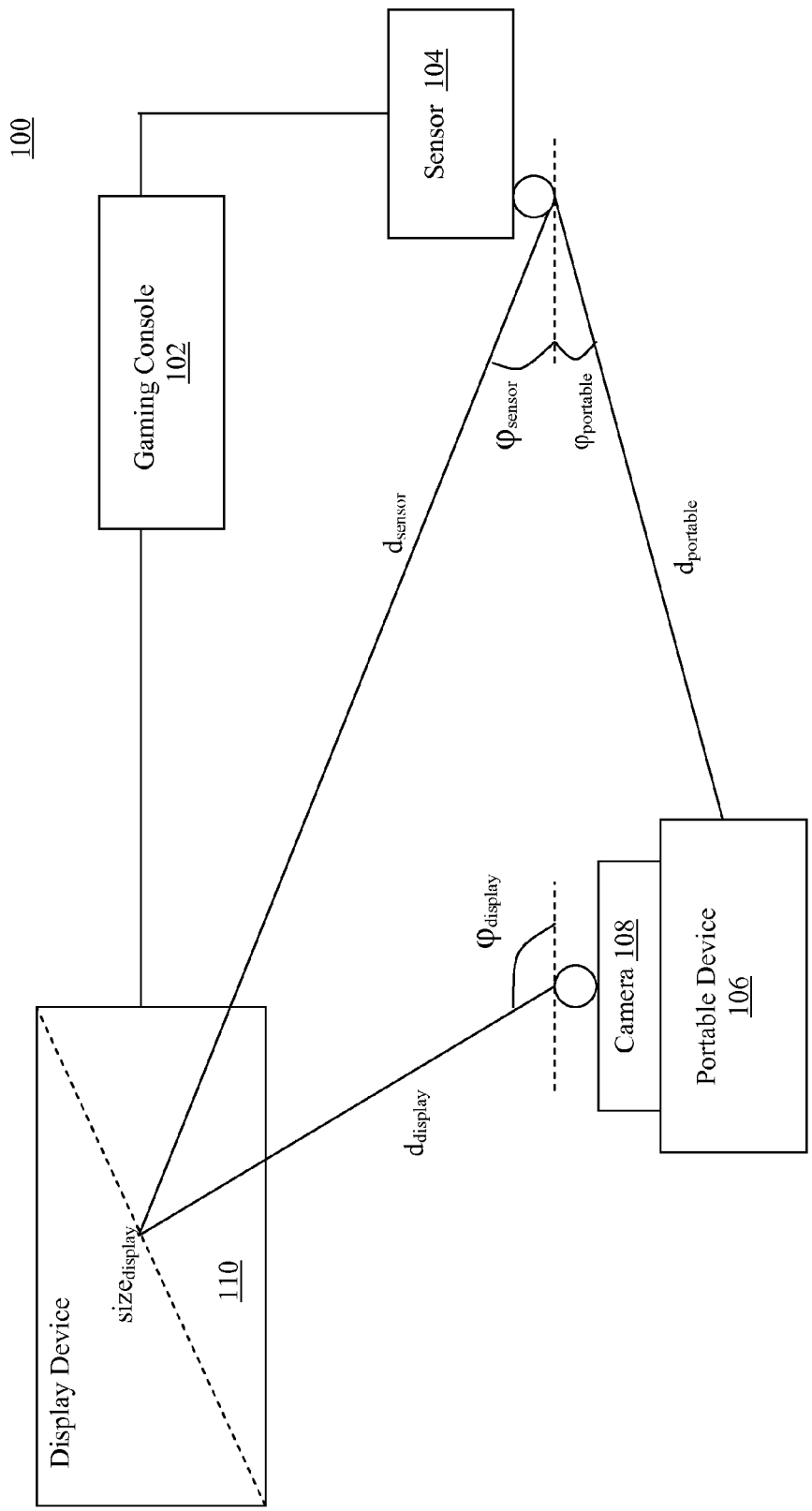
FIG. 1 is a schematic diagram of a gaming system in which a video game can be played.

As seen in FIG. 1, the present gaming system 100 includes a gaming console 102 having a sensor 104 that allows the gaming console 102 to track in three-space the position and orientation of an object, such as a portable device 106. The portable device 106 can have at least one marker, not shown, thereon for tracking by the sensor 104 of the gaming console 102. Additionally, the portable device 106 can include a camera 108 that is able to view a display device 110, such as a television, while the markers of the portable device 106 are being tracked by the sensor 104 of the gaming console 102. If the markers are placed in/on the back of the portable device 106, then the camera 108 on the portable device 106 should also be back-facing. However, if the portable device 106 has a front-facing camera 108, then the visual markers can actually be displayed on a screen of the portable device 106 to be tracked by the gaming console 102.

As further illustrated in FIG. 1, the present gaming system 100 can compute the distance ($d_{sensor}$) and the orientation ($\phi_{sensor}$) of the gaming console's sensor 104 relative to the display device 110, as well as the size of the display device ($size_{display}$) 110. Since the type and size of the portable device 106 being used are initially known by the gaming console 102, the gaming console 102 is able to determine the exact position and orientation of the portable device 106 with respect thereto.

The gaming system 100 initially discerns the type and size of the portable device 106, and can do so by various means. By way of one example, after the game system 100 has been turned on, the gaming system 100 may prompt the user to specify which type, make, and/or model of the portable device 106 is being used. The user may specify the type, make, and/or model of the portable device by accessing a database which includes a taxonomy of various portable devices from which the user can select. Once the user selects the appropriate portable device 106 from the taxonomy, the gaming system 100 can determine and/or retrieve specific parameters related to the selected portable device 106. The parameters of the portable device 106 can include information such as the size of a display (e.g., a display screen) of the portable device, the position of the camera's center relative to the display of portable device, and the characteristics of the camera and the camera's lens. The database that includes the taxonomy of portable devices may be stored in the memory of the gaming console 102, or may be stored on a server and accessed via a network, such as the Internet. Alternately, the gaming console 102 may automatically discern the type, make, and/or model of the portable device 106 used. The detection of the portable device 106 by the gaming console 102 may also include automatically detecting the specific parameters of that particular portable device 106, such as its size.

Because the size of the portable device 106 is initially known, the distance ($d_{portable}$) and orientation ($\phi_{portable}$) of the portable device 106 with respect to the gaming console's sensor 104 are also initially known. However, the size of the display device ($size_{display}$) 110 is unknown, and therefore the orientation ($\phi_{display}$) and distance ($d_{display}$) of the portable device 106 with respect to the display device 110 remains ambiguous.

The camera 108 of the portable device 106 is able to view and/or locate a positioning image that is displayed on the display device 110 prior to the video game actually being played. However, based on the trajectory of the portable device's camera 106, there are a multiplicity of candidate display devices that are varying in size and positioned at different distances from the portable device 106.

This is because the farther the portable device 206 is from the display device, the smaller the display device seems. Thus, initially there are two unknowns with respect to the display device, both the distance from the portable device 206 and the display device's size. However, by taking two observations of the display device from two different positions, the two unknowns can be resolved.

Figure 2A:
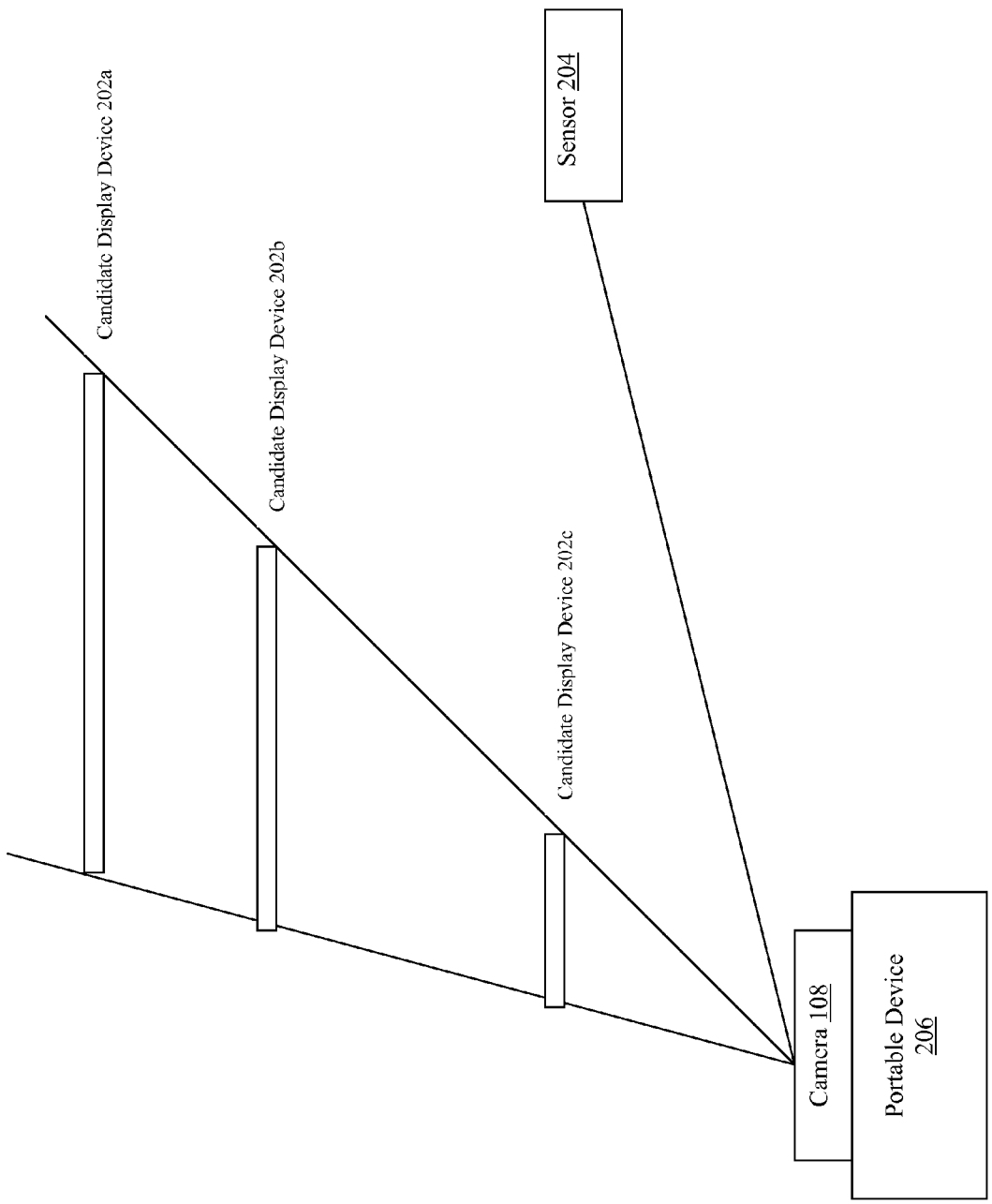
FIG. 2A is a schematic representation of a gaming system making a first estimation as to the position of a portable device with respect to a display device.
Figure 2B:
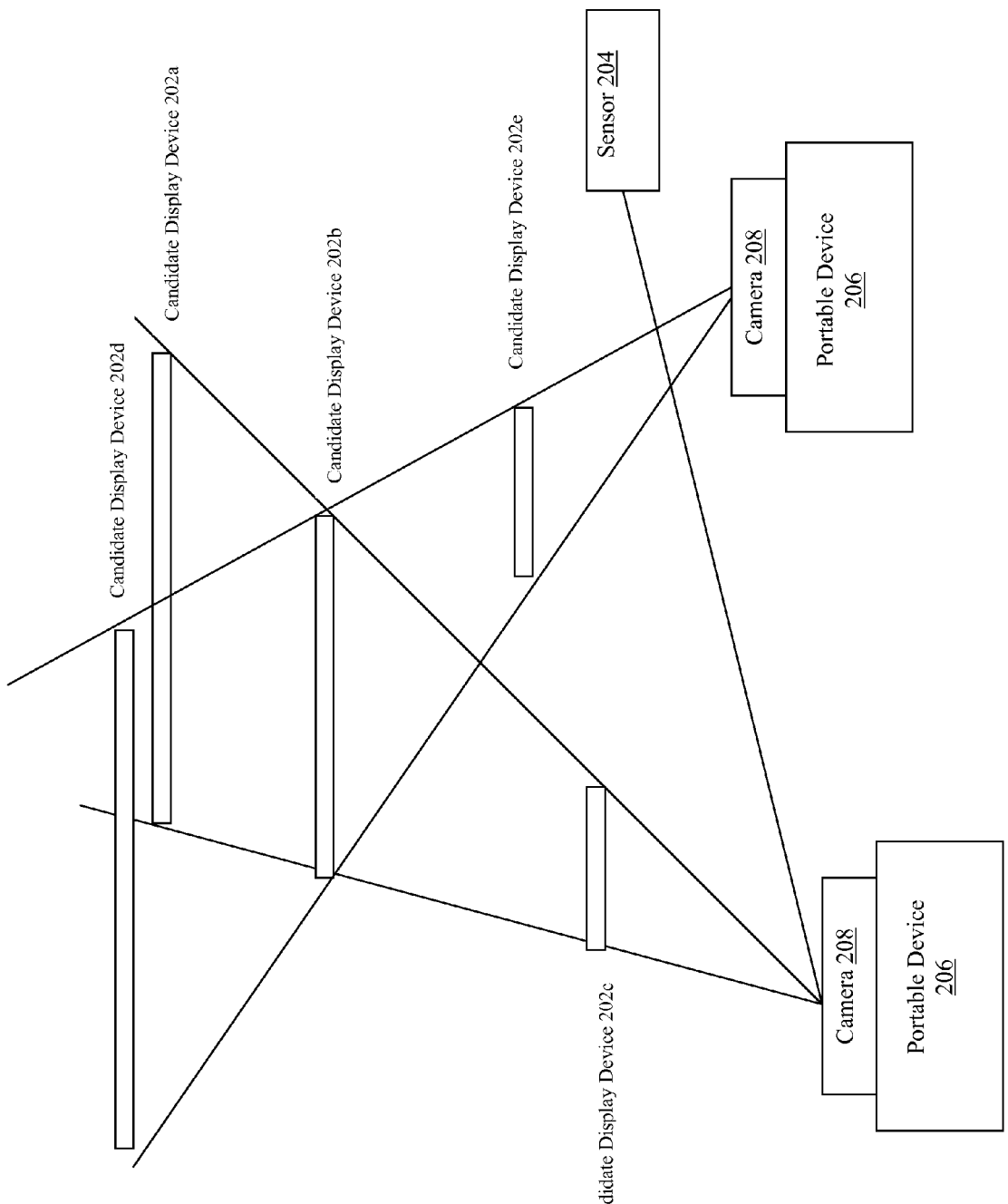
FIG. 2B is a schematic representation of a gaming system making a second estimation as to the position of a portable device with respect to the display device.

FIGS. 2A and 2B provide illustrative views as to the determination of the display device's distance with respect to the portable device, as well as the size of the display device.

Initially, when the gaming console's sensor 204 detects the movement of the portable device, there is ambiguity with respect to both the size of the display device and the distance from the display device to the portable device 206. For instance, candidate display device 202a is relatively large in size and at a relatively large distance from the portable device 206, as seen in FIG. 2A. Conversely, candidate display device 202c is relatively small in size, and relatively close to the portable device. On the other hand, candidate display device 202b is relatively medium size, and at a relatively medium distance from the portable device 206, as compared to candidate display devices 202a and 202c. Each of the candidate display devices could correspond to the image being viewed by the camera 108 of the portable device 206. This is essentially due to perspective projection, i.e., a small display device close by, as in candidate display device 202c, will look the same to the camera as a large display device located at a farther distance, as in candidate display device 202c.

As explained above, since the type of portable device 206 being used is known by gaming system, the size of the portable device 206 is also known. Therefore, when the gaming console's sensor 204 makes a single observation of the portable device 206, a determination of the actual distance of the portable device 206 to the sensor 204 can be made. When applying perspective projection mathematics to the orientation of the gaming console's sensor 204, the portable device 206, and display device 210, the following relationship is obtained:

$$size_{observed1} = size_{display}/distance_{display1}$$

However, the size of the display device 202a, 202b, 202c, and the distance of the display device to the portable device 206 are both still unknown. Consequently, at least one additional observation is needed before a determination as to the size and orientation of the display device can be made.

Therefore, the gaming console prompts the user to move the portable device to a new position (e.g., point 2), and to a position that is not along the axis that passes through the center of the three candidate display devices, so that a new observation of the display device from a new position can be made. As seen in FIG. 2B, there are now two sets of values which enables the determination of the display device's size and distance from the portable device Perspective projection mathematics is once again applied obtaining the new relationship:

$$size_{observed2} = size_{display}/distance_{display2}$$

There are a new number of candidate display devices 202b, 202d, and 202e, as seen in FIG. 2B, from the new position of the portable device 206. However, only one of the candidate display devices can be the correct one. In the instant example it is candidate display device 202b. Since the size of the display device remains constant ($size_{display}$), the two relationships from the two positions of the portable device are combined with the knowledge that only one size of the display device will satisfy both observations. Thus, the size and orientation of the display device can be determined.

Figure 3:
FIG. 3 is a flow chart for locating a portable device relative to a position of a display device in a gaming system.

FIG. 3 illustrates a flowchart for locating a sensor of a gaming console relative to a display device in a gaming system that takes advantage of the existing computer vision techniques that can determine the position of an object by a set of visible features and/or markers on the object. Each step in FIG. 3 will now be described in greater detail below.

As seen in step 302, a user is prompted by at least one cue on the display device to position the portable device so that an image on the display device can be detected by the portable device. The at least one cue may include at least one of written instructions, audible instructions, a picture, a pattern, and/or an image, or any combination thereof that would prompt a user to position the portable device in the manner recited above. Furthermore, the display device may be any one of a cathode ray tube, a flat panel display, a liquid crystal display (LCD), a plasma display panel (PDP), an organic light-emitting diode display (OLED), a field emission display (FED), a nanocrystal display, a laser TV, and an electroluminescent display (ELD), just to name a few. By way of example, the portable device may include at least one of a gaming system remote control, a universal remote control, a wireless controller, a cellular telephone equipped with a camera, a Sony PlayStation® Remote, and a Sony PlayStation® Portable (PSP™), among other types of remote controllers.

Next, in step 304, a first position of a gaming console relative to the portable device is determined using a sensor on the gaming console. Then, a first orientation of the gaming console relative to the portable device is determined using a sensor on the gaming console, in step 306. An image is displayed on the display device in step 308, and a camera on the portable device searches for the image on the display device in step 310.

The sensor on the gaming console may include any sensor that allows it to track the position and orientation of an object in three-space, but more specifically may include at least one of a camera, an ultrasonic emitter, an ultrasonic detector, a magnetic emitter, a magnetic coil, a light-emitting diode, or any combination thereof. The portable device may have a sensor, marker, or set of markers that are able to be tracked by the sensor of the gaming console. Similarly, the sensor on the portable device may include at least one of camera, an ultrasonic emitter, an ultrasonic detector, a magnetic emitter, a magnetic coil, a light-emitting diode, a motion sensor or any combination thereof. If the sensor on the gaming console is an ultrasonic emitter, then the sensor on the portable device should be an ultrasonic detector, and vice versa. In a similar fashion, if the sensor on the gaming console is a magnetic emitter, then the sensor on the portable device should be a magnetic coil, and vice versa.

If a portable device includes a marker or set of markers, as well as a camera that is able to view the display device at the same time, then the markers placed in the back of the device, then the camera on the device must also be back-facing. Conversely, if the portable device has a front facing camera, then the at least one marker can be displayed on a screen of the portable device to be tracked by the gaming console.

The first position and the first orientation of the display device relative to the portable device are estimated, after the sensor on the portable device has found the image on the display device in step 312. The estimating step can be accomplished using a known pose estimation algorithm. After step 312, the estimation of the first position and the first orientation of the gaming console relative to the display device are sent to the gaming console in step 314. Next, in step 316, the user is prompted to move the portable device to a second position. Then, the second position of the gaming console relative to the portable device using the gaming console is determined in step 318, and the second orientation of the portable device with respect to the gaming console is determined in step 320.

In step 322, the image displayed on the display device is searched for by the sensor of the portable device, from the second position of the portable device. Then, the second position and orientation of the portable device is estimated, for example again using a pose estimation algorithm as discussed above, after the sensor of the portable device has found the image on the display device, in step 324. The estimation of the second position and orientation are then sent to the gaming console, in step 326.

In step 328, using the first and second estimations sent to the gaming console, the size of the display device is determined, and instructing the user to move the portable device to a different position, if the second position is located along the axis that passes through center of the candidate display devices, in step 330. Then in step 332, using the first and second estimations the orientation of the display device is determined. The distance and orientation of the display device with respect to the sensor is determined in 334.

Figure 4:
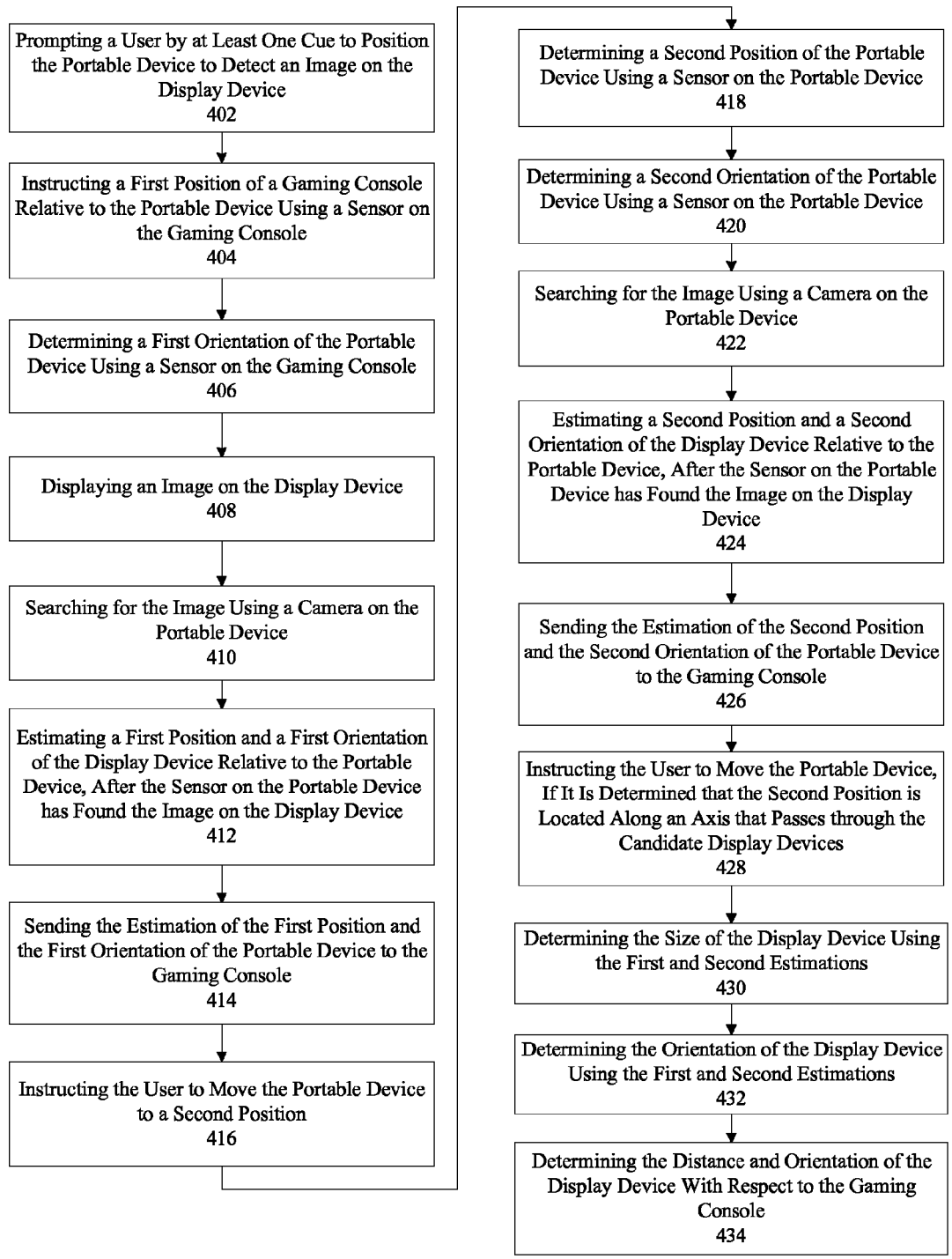
FIG. 4 is a flow chart for locating a portable device relative to a position of a display device in a gaming system, using a sensor on the portable device to determine the second position and orientation of the portable device.

FIG. 4 illustrates a flowchart for locating a sensor of a gaming console relative to a display device in a gaming system that takes advantage of the existing computer vision techniques that can determine the position of an object by a set of visible features and/or markers on the object, wherein the portable device uses, for example a motion sensor. Using this method, the sensor on the gaming console only needs to observe the portable device once. Thereafter, the portable device's initial position and orientation can be integrated with the changes detected by the motion sensor to compute the second position and orientation of the portable device. Each step in FIG. 4 will now be described in greater detail below.

As seen in step 402, a user is prompted by at least one cue on the display device to position the portable device so that an image on the display device can can be detected by the portable device. The at least one cue may include at least one of written instructions, audible instructions, a picture, a pattern, and/or an image, or any combination thereof that would prompt a user to position the portable device in the manner recited above. Furthermore, the display device may be any one of a cathode ray tube, a flat panel display, a liquid crystal display (LCD), a plasma display panel (PDP), an organic light-emitting diode display (OLED), a field emission display (FED), a nanocrystal display, a laser TV, and an electroluminescent display (ELD), just to name a few. By way of example, the portable device may include at least one of a gaming system remote control, a universal remote control, a wireless controller, a cellular telephone equipped with a camera, a Sony PlayStation® Remote, and a Sony PlayStation® Portable (PSP™), among other types of remote controllers.

Next, in step 404, a first position of a gaming console relative to the portable device is determined using a sensor on the gaming console. Then, a first orientation of the gaming console relative to the portable device is determined using a sensor on the gaming console, in step 306. An image is displayed on the display device in step 408, and a camera on the portable device searches for the image on the display device in step 410. The sensor on the gaming console may include any sensor that allows it to track the position and orientation of an object in three-space, but more specifically may include at least one of a camera, an ultrasonic emitter, an ultrasonic detector, a magnetic emitter, a magnetic coil, a light-emitting diode, or any combination thereof. The portable device may have a sensor, marker, or set of markers that are able to be tracked by the sensor of the gaming console. Similarly, the sensor on the portable device may include a sensor that is able to track its position, such as a motion sensor, but may also include at least one of camera, an ultrasonic emitter, an ultrasonic detector, a magnetic emitter, a magnetic coil, a light-emitting diode or any combination thereof. If the sensor on the gaming console is an ultrasonic emitter, then the sensor on the portable device should be an ultrasonic detector, and vice versa. In a similar fashion, if the sensor on the gaming console is a magnetic emitter, then the sensor on the portable device should include a magnetic coil, and vice versa.

If a portable device includes a marker or set of markers, as well as a camera that is able to view the display device at the same time, then the markers placed in the back of the device, then the camera on the device must also be back-facing. Conversely, if the portable device has a front facing camera, then the at least one marker can be displayed on a screen of the portable device to be tracked by the gaming console.

The first position and the first orientation of the display device relative to the portable device are estimated, after the sensor on the portable device has found the image on the display device in step 412. The estimating step can be accomplished using a known position estimation algorithm. After step 412, the estimation of the first position and the first orientation of the gaming console relative to the display device are sent to the gaming console in step 414. Next, in step 416, the user is prompted to move the portable device to a second position. Then, the second position of the portable device relative to the gaming console is determined using the sensor on the portable device in step 418, and the second orientation of the portable device with respect to the gaming console using the sensor on the portable device is determined in step 420.

In step 422, the image displayed on the display device is searched for by the sensor of the portable device, from the second position of the portable device. Then, the second position and orientation of the portable device is estimated, for example again using a position estimation algorithm as discussed above, after the sensor of the portable device has found the image on the display device, in step 424. The estimation of the second position and orientation are then sent to the gaming console, in step 426.

In step 428, using the first and second estimations sent to the gaming console, the size of the display device is determined. The user is instructed to move the portable device to a different position, if the second position is located along the axis that passes through the center of the candidate display devices, in step 430. Then in step 432, using the first and second estimations the orientation of the display device is determined. The distance and orientation of the display device with respect to the sensor is determined in 434.

In accordance with this disclosure, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Eraseable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card, paper tape and the like) and other types of program memory.

While embodiments and applications have been shown and described, it would be apparent to those skilled in the art having the benefit of this disclosure that many more modifications than mentioned above are possible without departing from the inventive concepts disclosed herein. The invention, therefore, is not to be restricted except in the spirit of the appended claims.

What is claimed is:

1. A method for locating a sensor of a gaming console relative to a position of a display device in a gaming system, comprising:

displaying an image on the display device;

capturing the displayed image using a portable device at a first location and generating first capture information associated with the capture at the first location;

obtaining information relating a type of the portable device;

estimating, using a processor, a first position and first orientation of the display device relative to the portable device from the first capture information and from the obtained information relating to the type of the portable device;

capturing the displayed image using the portable device at a second location and generating second capture information associated with the capture at the second location; estimating, using a processor, a second position and second orientation of the display device relative to the portable device from the second capture information;

determining, using a processor, the size of the display device using information gathered based on the estimating of the first position and orientation and the estimating of the second position and orientation; and determining, using a processor, the orientation of the display device relative to the sensor of the gaming console using information gathered during the estimating of the first position and orientation and the estimating of the second position and orientation, and using information, derived from the obtained information relating to the type of the portable device, that is indicative of a location of the portable device relative to the sensor of the gaming console.

2. A method according to claim 1, further comprising:

instructing the portable device to search for the image, wherein the gaming console instructs the portable device to search for the image;

searching for the image on the display device using a camera on the portable device;

searching the image on the camera of the portable device for a pattern on the display device; and sending findings of the portable device to the gaming console, wherein the portable device wirelessly sends the findings to the gaming console.

3. The method according to claim 1, further comprising:

determining a first position of the gaming console relative to the portable device using the sensor on the gaming console;

determining a first orientation of the gaming console relative to the portable device using the sensor on the gaming console;

determining a second position of the gaming console relative to the portable device using the sensor on the gaming console;

determining a second orientation of the gaming console relative to the portable device using the sensor on the gaming console;

instructing the portable device to search for the image on the display device from the second position, wherein the gaming console instructs the portable device to search for the image; searching for the image on the display device from the second position of the portable device using a camera on the portable device;

searching the image of the sensor on the portable device for a pattern on the display device;

sending new findings of the portable device to the gaming console, wherein the portable device wirelessly sends the findings to the gaming console.

4. A method according to claim 1, further comprising: prompting a user to position the portable device such that a sensor on the portable device can detect an image on the display device.

5. A method according to claim 1, further comprising: instructing the display device to display an image, wherein the gaming console instructs the display device to display the image.

6. A method according to claim 1, further comprising: detecting the movement of the portable device using the gaming console.

7. A method according to claim 1, wherein the steps of estimating the first position and the first orientation of the portable device are accomplished using a pose estimation algorithm.

8. A method according to claim 1, wherein the steps of estimating the second position and the second orientation of the portable device are accomplished using a pose estimation algorithm.

9. A method according to claim 1, wherein the portable device includes at least one of a gamepad, a joystick, a universal remote, a remote controller, or a cellular telephone equipped with a camera.

10. A method according to claim 1, wherein the gaming console is a video gaming console.

11. A method according to claim 1, wherein the display device includes at least one of a cathode ray tube, a flat panel display, a liquid crystal display (LCD), a plasma display panel (PDP), an organic light-emitting diode display (OLED), a field emission display (FED), a nanocrystal display, a laser TV, and an electroluminescent display (ELD).

12. A method according to claim 1, wherein the sensor of the gaming console comprises at least one of a camera, an ultrasonic emitter, an ultrasonic detector, a magnetic emitter, a magnetic coil, a light-emitting diode, or any combination thereof.

13. A method according to claim 1, wherein the portable device uses a sensor that comprises at least one of a camera, an ultrasonic emitter, an ultrasonic detector, a magnetic emitter, a magnetic coil, a light-emitting diode, or any combination thereof.

14. A method according to claim 1, further comprising: instructing the user to move the portable device to a different new position, if it is determined that the new position is along an axis that passes through candidate display devices representing a potential position of the display device.

15. A system for locating a sensor of a gaming console relative to a position of a display device in a gaming system, comprising:

means for displaying an image on the display device;

means for capturing, at first and second locations, the displayed image, and for generating first and second capture information associated respectively with the captures at the first and second locations;

obtaining information relating a type of the means for capturing;

means for estimating a first position and first orientation of the display device, relative to the means for capturing, using the first capture information and the obtained information relating to the type of the means for capturing, and for estimating a second position and second orientation of the display device, relative to the means for capturing, using the second capture information;

means for determining the size of the display device using information gathered during the estimating of the first position and orientation and the estimating of the second position and orientation; and means for determining the orientation of the display device relative to a sensor of the gaming console using information gathered during the estimating of the first position and orientation and the estimating of the second position and orientation, and using information, derived from the obtained information relating to the type of the means for capturing, that is indicative of a location of the portable device relative to the sensor of the gaming console.

16. A system according to claim 15, further comprising:

means for instructing the portable device to search for the image, wherein the gaming console instructs the portable device to search for the image;

means for searching for the image on the display device using a camera on the portable device;

means for searching the image on the camera of the portable device for a pattern on the display device; and means for sending findings of the portable device to the gaming console, wherein the portable device wirelessly sends the findings to the gaming console.

17. The system according to claim 15, further comprising:

means for determining a first position of the gaming console relative to the portable device using a sensor on the gaming console; means for determining a first orientation of the gaming console relative to the portable device using the sensor on the gaming console;

means for determining a second position of the gaming console relative to the portable device using the sensor on the gaming console;

means for determining a second orientation of the gaming console relative to the portable device using the sensor on the gaming console; means for instructing the portable device to search for the image on the display device from the second position, wherein the gaming console instructs the portable device to search for the image; and means for searching for the image on the display device from the second position of the portable device using the sensor on the portable device;

means for searching the image of the sensor on the portable device for a pattern on the display device; and means for sending new findings of the portable device to the gaming console, wherein the portable device wirelessly sends the findings to the gaming console.

18. A system according to claim 15, further comprising: means for prompting a user to position the portable device such that a sensor on the portable device can detect an image on the display device.

19. A system according to claim 15, further comprising: means for instructing the display device to display an image, wherein the gaming console instructs the display device to display the image.

20. A system according to claim 15, further comprising: means for detecting the movement of the portable device using the gaming console.

21. A system according to claim 15, wherein the means for estimating the first position and the first orientation of the portable device uses a pose estimation algorithm.

22. A system according to claim 15, wherein the means for estimating the second position and the second orientation of the portable device uses a pose estimation algorithm.

23. A system according to claim 15, wherein the portable device includes at least one of a gamepad, a joystick, a universal remote, a remote controller, or a cellular telephone equipped with a camera.

24. A system according to claim 15, wherein the gaming console is a video gaming console.

25. A system according to claim 15, wherein the display device comprises at least one of a cathode ray tube, a flat panel display, a liquid crystal display (LCD), a plasma display panel (PDP), an organic light-emitting diode display (OLED), a field emission display (FED), a nanocrystal display, a laser TV, and an electroluminescent display (ELD).

26. A system according to claim 15, wherein the sensor of the gaming console comprises at least one of a camera, an ultrasonic emitter, an ultrasonic detector, a magnetic emitter, a magnetic coil, a light-emitting diode, or any combination thereof.

27. A system according to claim 15, wherein the portable device uses a sensor that comprises at least one of a camera, an ultrasonic emitter, an ultrasonic detector, a magnetic emitter, a magnetic coil, a light-emitting diode, or any combination thereof.

28. A system according to claim 15, further comprising: means for instructing the user to move the portable device to a different new position, if it is determined that the new position is along an axis that passes through candidate display devices each representing a potential position of the display device.

29. A non-transitory computer-readable medium embodying a program of instructions readable by the computer to perform a method for use in a gaming system for locating a sensor of a gaming console relative to a position of a display device the gaming system, the method comprising:
 displaying an image on the display device;
 obtaining information relating a type of a portable device;
 estimating a first position and first orientation of the display device relative to a the portable device disposed at a first portable device position, once the portable device has found the image on the display device;
 estimating a second position and second orientation of the display device relative to the portable device disposed at a second portable device position, once the portable device has found the image on the display device;
 determining the size of the display device using information gathered during the estimating of the first position and orientation and the estimating of the second position and orientation; and
 determining the orientation of the display device relative to the sensor of the gaming console using information gathered during the estimating of the first position and orientation and the estimating of the second position and orientation, and using information, derived from the information relating to the type of portable device, that is indicative of a location of the portable device relative to the sensor of the gaming console.

30. The non-transitory computer-readable medium according to claim 29, the method further comprising:
 instructing the portable device to search for the image, wherein the gaming console instructs the portable device to search for the image; searching for the image on the display device using a camera on the portable device; searching the image on the camera of the portable device for a pattern on the display device; and sending findings of the portable device to the gaming console, wherein the portable device wirelessly sends the findings to the gaming console.

31. The non-transitory computer-readable medium according to claim 29, the method further comprising:
 determining a first position of the gaming console relative to the portable device using the sensor on the gaming console;
 determining a first orientation of the gaming console relative to the portable device using the sensor on the gaming console;
 determining a second position of the gaming console relative to the portable device using the sensor on the gaming console; determining a second orientation of the gaming console relative to the portable device using the sensor on the gaming console;
 instructing the portable device to search for the image on the display device from the second position, wherein the gaming console instructs the portable device to search for the image;
 searching for the image on the display device from the second position of the portable device using the sensor on the portable device;
 searching the image of the sensor on the portable device for a pattern on the display device; and
 sending new findings of the portable device to the gaming console, wherein the portable device wirelessly sends the findings to the gaming console.

32. The non-transitory computer-readable medium according to claim 29, the method further comprising:
 prompting a user to position the portable device such that a sensor on the portable device can detect an image on the display device.

33. The non-transitory computer-readable medium according to claim 29, the method further comprising:
 instructing the display device to display an image, wherein the gaming console instructs the display device to display the image.

34. The non-transitory computer-readable medium according to claim 29, the method further comprising:
 detecting the movement of the portable device using the gaming console.

35. The non-transitory computer-readable medium according to claim 29, wherein estimating the first position and the first orientation of the portable device uses a pose estimation algorithm.

36. The non-transitory computer-readable medium according to claim 29, wherein estimating the second position and the second orientation of the portable device uses a pose estimation algorithm.

37. The non-transitory computer-readable medium according to claim 29, wherein the portable device includes at least one of a gamepad, a joystick, a universal remote, a remote controller, or a cellular telephone equipped with a camera.

38. The non-transitory computer-readable medium according to claim 29, wherein the gaming console is a video gaming console.

39. The non-transitory computer-readable medium according to claim 29, wherein the display device comprises at least one of a cathode ray tube, a flat panel display, a liquid crystal display (LCD), a plasma display panel (PDP), an organic light-emitting diode display (OLED), a field emission display (FED), a nanocrystal display, a laser TV, and an electroluminescent display (ELD).

40. The non-transitory computer-readable medium according to claim 29, wherein the sensor of the gaming console comprises at least one of a camera, an ultrasonic emitter, an ultrasonic detector, a magnetic emitter, a magnetic coil, a light-emitting diode, or any combination thereof.

41. The non-transitory computer-readable medium according to claim 29, wherein the portable device uses a sensor that comprises at least one of a camera, an ultrasonic emitter, an ultrasonic detector, a magnetic emitter, a magnetic coil, a light-emitting diode, or any combination thereof.

42. The non-transitory computer-readable medium according to claim 29, the method further comprising:
instructing the user to move the portable device to a different new position, if it is determined that the new position is along an axis that passes through candidate display devices each representing a potential position of the display device.

43. The method according to claim 1, further comprising: determining a first position of the gaming console relative to the portable device using the sensor on the gaming console; determining a first orientation of the gaming console relative to the portable device using the sensor on the gaming console; determining a second position of the gaming console relative to the portable device using the sensor on the portable device;
determining a second orientation of the gaming console relative to the portable device using the sensor on the portable device; instructing the portable device to search for the image on the display device from the second position, wherein the gaming console instructs the portable device to search for the image; searching for the image on the display device from the second position of the portable device using a camera on the portable device; searching the image of the sensor on the portable device for the pattern on the display device; sending new findings of the portable device to the gaming console, wherein the portable device wirelessly sends the findings to the gaming console.

44. The system according to claim 15, further comprising: means for determining a first position of the gaming console relative to the portable device using the sensor on the gaming console; means for determining a first orientation of the gaming console relative to the portable device using the sensor on the gaming console; means for determining a second position of the gaming console relative to the portable device using the sensor on the portable device; means for determining a second orientation of the gaming console relative to the portable device using the sensor on the portable device;
means for instructing the portable device to search for the image on the display device from the second position, wherein the gaming console instructs the portable device to search for the image; and means for searching for the image on the display device from the second position of the portable device using the sensor on the portable device;
means for searching the image of the sensor on the portable device for the pattern on the display device; and means for sending new findings of the portable device to the gaming console, wherein the portable device wirelessly sends the findings to the gaming console.

45. The non-transitory computer-readable medium according to claim 29, the method further comprising:
determining a first position of the gaming console relative to the portable device using the sensor on the gaming console;
determining a first orientation of the gaming console relative to the portable device using the sensor on the gaming console;
determining a second position of the gaming console relative to the portable device using the sensor on the portable device; determining a second orientation of the gaming console relative to the portable device using the sensor on the portable device;
instructing the portable device to search for the image on the display device from the second position, wherein the gaming console instructs the portable device to search for the image;
searching for the image on the display device from the second position of the portable device using the sensor on the portable device;
searching the image of the sensor on the portable device for the pattern on the display device; and
sending new findings of the portable device to the gaming console, wherein the portable device wirelessly sends the findings to the gaming console.

* * * * *